3,443,630
MAGNESIUM SURFACE FOR COOLING TiO$_2$
Joseph Robert Auld, Wilmington, Del., assignor to E. I. du Pont de Nemours and Company, Wilmington, Del., a corporation of Delaware
Filed June 19, 1967, Ser. No. 647,014
Int. Cl. F28f 19/06; C01g 23/04
U.S. Cl. 165—1                                4 Claims

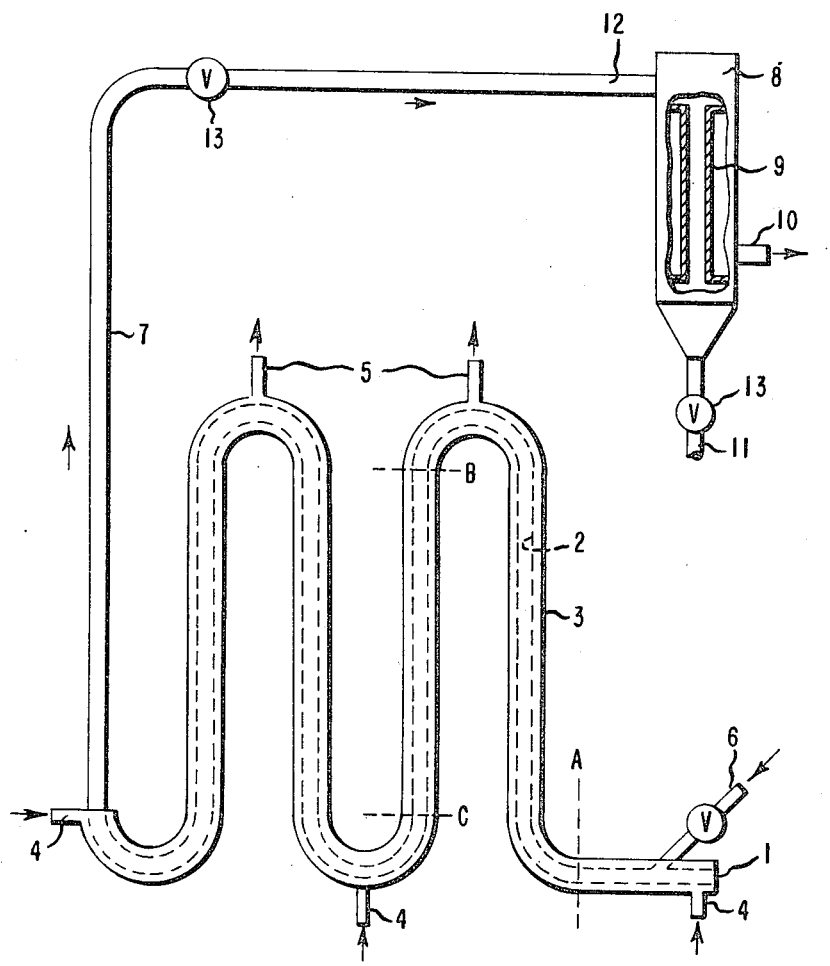

ABSTRACT OF THE DISCLOSURE

The hot effluent gases and solids from the oxidation of titanium tetrachloride are cooled by flowing contact with a magnesium wall which separates the effluent from the cooling medium.

Background of the invention

In the vapor phase oxidation of titanium tetrachloride the reactants are principally oxygen and titanium tetrachloride. Other substances may be present such as recirculated chlorine, inert diluent gases, and nitrogen, the latter frequently being derived from the use of air as the oxidizing agent and small amounts of H$_2$O and other so-called nucleating agents. This reaction takes place in the temperature range of from 800 to about 1600° C. The time for the reaction is rather brief, and it is deemed desirable to quench the products of the reaction rapidly to obtain good pigment quality. This quenching or cooling has been accomplished by passing the effluent materials which include solid suspended particles of titanium dioxide, chlorine, some oxygen, and traces of hydrogen chloride and titanium chloride, through a cooled metal conduit which acts as a heat exchange device. The effluent is preferably cooled to the neighborhood of 100° C. in order to make possible the collection of the pigment with cyclones and filter bags. The selection of materials used as heat exchange media for these very corrosive materials has been a problem. Ceramic ducts have been tried but due to their poor heat conductivity, the inner surfaces are not maintained cool enough to avoid deposition of solid material and hence, plugging of the ducts occurs. From this experience it is apparent that metals having a high heat conductivity would be preferred since their inner surfaces would be more easily maintained in a cooled state. The selection of the suitable metal however presents problems with respect to both mechanical strength and durability under the corrosive and erosive conditions present and also in view of the possibility of contaminating the white pigment product. It has been found that nickel and aluminum in combination will hold up under these circumstances well enough to be useful in this system. Such installations are described in U.S. Patent Number 2,833,627. The nickel is used in the hotter zones and in relatively short sections of the conduit because of the possibility of contaminating the TiO$_2$ product with dark-colored nickel oxide; thus a section of nickel is used at the first or hot end of the conduit and the remainder is constructed of aluminum. The main aluminum conduit is water-jacketed for cooling purposes. Aluminum is used because of its high heat conductivity and also because of the fact that its oxide is white and hence discoloration of the product does not occur because of it. In practice however and in spite of the vigorous cooling by circulating water, it has been found that titanium dioxide coats the inner surface of the aluminum conduits, thereby decreasing the heat transfer coefficient to such an extent that operation of a plant having a cooling capacity calculated on the basis of the aluminum metal has to be shut down in a matter of a few hours because the final temperature becomes too high for use of the filter bags. This coating on the inside of the aluminum metal apparently occurs throughout the length of the conduit from the hot end to the cold end, consequently, it is concluded that more vigorous cooling would not solve the problem.

In order to make the aluminum cooling conduits operative, it was found necessary to remove the deposited titanium dioxide by continuously supplying abrasive solid particles to the stream passing through the conduits. This procedure is described in U.S. Patents Nos. 2,899,278 and 2,721,626. While the scrub solids have succeeded in keeping the aluminum surface clean and maintaining good heat transfer they require a separation step in the process, or they must be ground to pigment size along with the pigment in later stages of process.

Summary of the invention

The present invention provides a process wherein the hot suspension of TiO$_2$ particles in the gaseous effluent which results from the high temperature reaction of titanium tetrachloride vapor with oxygen, either pure or mixed with nitrogen and other process gases, is cooled by contact with a cooled magnesium surface. The effluent is cooled from temperatures as high as 1100° C. to about 100° C. or below for separation and recovery of the titanium dioxide pigment product.

Description of drawing

The drawing is a schematic representation of an apparatus useful in illustrating the advantages of the present invention. In the apparatus illustrated, a hot suspension of TiO$_2$ pigment particles resulting from the high temperature reaction of titanium tetrachloride vapor with oxygen, from a source not shown, is fed through entrance port 1 into a jacketed conduit composed of an inner wall 2 and a jacketing wall 3. Inner wall 2 is constructed in four sections, i.e. from inlet 1 to A, from A to B, from B to C and from C to the outlet end. Cooling fluid is supplied to the jacket at coolant inlets 4 and is discharged at coolant outlets 5. When necessary, abrasive solids are introduced into the system at scrub solids inlet 6. After passing through the jacketed conduit, the coated suspension passes through conveyor pipe 7 into separator 8 where gases and solids are separated at filter bag 9, the gases passing through bag 9 and being discharged at gas outlet 10 whereas solid TiO$_2$ drops down through storage line 11 into TiO$_2$ storage (not shown). A thermocouple 12 monitors the temperature of gases passing into the separator. Valves 13 permit control of gaseous flow and solids removal.

The following example is cited to illustrate the invention. It is not intended to limit it in any manner.

Example

Apparatus is prepared corresponding to that illustrated in the drawing wherein inner wall 2 of the jacketed conduit is formed from three different metals, arranged along the vapor flow path and starting at entrance port 1 as follows: (a) nickel from inlet 1 to A, (b) standard aluminum tubing from A to B, (c) an alloy of magnesium containing 1.2% by weight manganese from B to C and (d) standard aluminum tubing from C to the outlet end of the jacketed conduit. The scrub solids used are small particles, about 10 to 100 mesh of TiO$_2$. Cold water is supplied as coolant to the jacketed conduit. Inner wall 2 of the conduit is 12 inches I.D. and each leg is approximately 60 feet high. The magnesium section (i.e. B to C) is 10 feet high. During the test TiCl$_4$ vapor is oxidized with heated air enriched with oxygen producing TiO$_2$ at an average of 1.7 tons/hour. The reaction products are passed through the equipment until the temperature at thermocouple 12 reaches 190° C. whereupon scrub solids are increased slightly to clean the walls and drop the temperature. A thermal equilibrium is reached at 75° C. using 250 #/hr. of scrub solids. After 48 hours of operation the unit is shut down rapidly and the inner wall surfaces examined. A coating of $TiO_2$ about ⅛ in. thick is found on the aluminum and nickel but the magnesium test section is free of such coating. The operation is resumed and the scrub solids decreased until thermocouple 12 indicates 120° C. whereupon the operation is quickly shut down. Inspection discloses that the aluminum conduits are more heavily coated with $TiO_2$ but the magnesium section is still clean. In another test the equipment is washed out, dried and operation is resumed with no scrub solids being added. In four hours shut down was mandatory because of the rising temperature at the separator. Examination shows a heavy pigment coat on the aluminum conduit but the magnesium section is still substantially clean. When the aluminum is completely replaced with magnesium satisfactory cooling is obtained with little or no scrub solid added.

In the preferred embodiment the entire cooling conduit is of magnesium or its alloy except a relatively short hot end section of nickel at the inlet end of the jacketed conduit. Pure magnesium metal is satisfactory but is mechanically somewhat weaker in the 300° C. range than some of its alloys. One of the preferred magnesium alloys is magnesium with 1.2% manganese. Other satisfactory magnesium alloys are those containing (1) 3% aluminum, 1% zirconium and .2% manganese, (2) 3% aluminum and 1% zinc, (3) 1.2% manganese and 3% thorium and (4) 2.3 to 6% zinc and at least about 0.4% zirconium, all percentages being by weight. Since the weak point at elevated temperatures in this system appears to be mechanical in nature, dispersion-strengthened magnesium and its alloys are advantageous. Pure magnesium having very fine particles of refractory oxides such as thoria, magnesium oxide, calcium oxide etc. dispersed in it are satisfactory, both from the point of view of its increased mechanical strength and resistance to the corrosion and erosion.

Advantages of using magnesium instead of aluminum are outstanding with respect to the amount of titanium dioxide which deposits on the surface. Aluminum conduits in service in a 35 ton/day plant and cleaned by means of scrub solids still require periodic shutdown and cleaning by water washing. After this washing, an 8-hour period is necessary to dry the system prior to starting up of operations again. When a section of the cooling conduit is made from magnesium thereby giving a direct comparison between magnesium and aluminum it is found that the magnesium section remains substantially clean for periods of weeks while the aluminum requires additional cleaning.

While it is not understood why magnesium is superior to aluminum, it is possible that magnesium reacts with a component of the hot effluent to form a non-sticking coating. In comparing aluminum with ceramic heat exchange materials, it was believed that improved heat transfer coefficients would minimize surface depositions which have been found to be more likely to form on hot surfaces. However, aluminum has a relatively high thermal conductivity of .503 c.g.s. while magnesium has a thermal conductivity only .376 at 100° C. From this point of view magnesium would not be expected to do as well as the aluminum in regard to resisting deposition of solids.

Many equivalent modifications of the present invention will become apparent to those skilled in the art from a reading of the above without a departure from the inventive concept.

What is claimed is:

1. A process for cooling a hot suspension of $TiO_2$ in gases resulting from the high temperature reaction of titanium tetrachloride vapor with oxygen which comprises passing the said hot suspension over a cooled surface of magnesium.

2. The process of claim 1 wherein the said surface is of an alloy of magnesium containing 1.2% by weight of manganese.

3. Reaction equipment comprising generating means to provide a hot suspension of $TiO_2$ particles in a gaseous effluent resulting from the high temperature reaction of titanium tetrachloride vapor with oxygen, separating means to separate the said particles from the said effluent, and situated between and connecting the said generating means and the said separating means to provide passage of the said effluent from the said generating means to the said separating means, a jacketed conduit consisting of two concentric pipes, the outer of the said concentric pipes being adapted to recevie a coolant and the inner of the said concentric pipes being formed of magnesium.

4. The reaction equipment of claim 3 wherein the inner said concentric pipe of magnesium is preceded at its generating means connection by a short section of nickel pipe.

References Cited
UNITED STATES PATENTS

| | | | |
|---|---|---|---|
| 2,721,626 | 10/1955 | Rick | 165—139 |
| 2,833,627 | 5/1958 | Krchma | 165—154 |
| 3,237,683 | 3/1966 | Silversmith | 165—1 |

MEYER PERLIN, *Primary Examiner.*

CHARLES SUKALO, *Assistant Examiner.*

U.S. Cl. X.R.

165—111, 143, 154; 23—202